(12) United States Patent
Vange et al.

(10) Patent No.: US 6,390,922 B1
(45) Date of Patent: *May 21, 2002

(54) INITIATING AND SCALING MASSIVE CONCURRENT DATA TRANSACTIONS

(75) Inventors: Mark Vange, Toronto (CA); Alexander Effimov, St. Petersburg (RU); Michael Kouts, Toronto (CA); Vladimir Lagutin, St. Petersburg (RU); David McKeller, Toronto (CA); Marc Plumb, Toronto (CA); Daniel Shields, Toronto (CA); Glen Wilson, Toronto (CA)

(73) Assignee: Circadence Corporation, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/513,606

(22) Filed: Feb. 23, 2000

Related U.S. Application Data

(63) Continuation of application No. 08/856,442, filed on May 14, 1997, now Pat. No. 6,050,898.
(60) Provisional application No. 60/017,768, filed on May 15, 1996.

(51) Int. Cl.[7] ................................................ A63F 13/00
(52) U.S. Cl. ............................ 463/42; 413/40; 413/41
(58) Field of Search ................................ 463/40–42, 17, 463/18, 29; 709/238, 240

(56) References Cited

U.S. PATENT DOCUMENTS

| | | | | |
|---|---|---|---|---|
| 5,050,161 A | * | 9/1991 | Golestani | 370/60 |
| 5,586,257 A | * | 12/1996 | Perlman | 463/42 |
| 5,586,937 A | * | 12/1996 | Manashe | 463/41 |
| 5,634,006 A | * | 5/1997 | Baugher et al. | 395/200.06 |
| 5,790,753 A | * | 8/1998 | Krishnomoorthy et al. | 395/200.33 |
| 5,820,463 A | * | 10/1998 | O'Callaghan | 463/42 |
| 5,830,069 A | * | 11/1998 | Soltesz et al. | 463/42 |
| 5,841,980 A | * | 11/1998 | Waters et al. | 395/200.34 |
| 5,894,556 A | * | 4/1999 | Grimm et al. | 395/200.57 |
| 5,974,028 A | * | 10/1999 | Ramakrishnan | 370/229 |

FOREIGN PATENT DOCUMENTS

| | | | |
|---|---|---|---|
| WO | WO 93/23125 | * | 11/1993 |
| WO | WO 95/08793 | * | 3/1995 |

* cited by examiner

Primary Examiner—Jessica J. Harrison
Assistant Examiner—John M Hotaling, II
(74) Attorney, Agent, or Firm—Stuart T. Langley; Kent A. Lembke; Hogan & Hartson, LLP

(57) ABSTRACT

An interactive multi-player computer hosted game employs an unstructured telecommunications link, such as the Internet, between a game server and a plurality of game clients. A game server, associated with a game driver, performs a performance monitoring function to determine an optimal bandwidth for each connection to a game client. Each information packet generated by the game driver is prioritized and queued for transmission in order of relevance for the game client. The game server then optimizes the transmission of information packets through the telecommunication network to the game client. Processed user input is received through the telecommunication network from the game client and transmitted to the game driver.

23 Claims, 3 Drawing Sheets

INITIATING AND SCALING MASSIVE CONCURRENT DATA TRANSACTIONS

This application is a continuation of U.S. application No. 08/856,442, filed May 14, 1997, issued as U.S. Pat. No. 6,050,898, which claims the benefit of U.S. Provisional Application No. 60/017,768, filed May 15, 1996.

FIELD OF THE INVENTION

The present invention relates to a system and method of providing an interactive computer-hosted game to multiple players via a communications system.

BACKGROUND OF THE INVENTION

Computer-hosted games are popular and comprise a wide variety of game subject matter ranging from conventional games such as chess to more exotic games such as flight combat simulators. Traditionally, in most of these games the player competed against the computer, which emulated an opponent, or against another player present at the location of the computer, or a combination of both.

More recently, some computer-hosted games have provided features whereby two or more players can play the game, either cooperatively or competitively, via modem-based, local area network based, or Internet based telecommunications links between each player's computer.

While such multi-player games have enjoyed considerable success, they are relatively limited in the number of players which can participate, often allowing no more than a maximum of four players, and require structured telecommunications links between the player's computers in order to function properly. Specifically, either a dial up telephone link or a local area network link must be established between the player's computers so that minimal latency and guaranteed deliverability of information through the telecommunications link is provided.

Particular examples of Internet-based games include Multi-User Dungeons (MUDs), AIR WARRIOR, WARBIRDS, SUBSPACE, and MERIDIAN 59. MUDs are text based games where multiple users interact, but only in small groups. Players are grouped according to the room in which the player is at any time. Only those players in the same room will interact with each other. However, since the game is text based, latency of transmission of information is not a problem for a smooth operation of the game. Further, there is usually a limit on the number of players who may enter a room at any time.

In AIR WARRIOR, WARBIRDS, SUBSPACE and MERIDIAN 59, there appears to be no apparent limit on the number of players who may play the game at any given time, nor a means of assessing band width requirements and throughput. While the air space of the game may be logically divided, there is no control over the bandwidth of transmission. All information is transmitted on the assumption that all information will arrive at the intended destination in time. Clearly, the assumption becomes less viable as the number of payers and their level of interaction increases.

SUMMARY OF THE INVENTION

It is an object of the present invention to provide a novel multi-layer game system and method which obviates or mitigates at least one of the disadvantages of the prior art.

It is desirable to have a multi-layer game system and method which will support a relatively larger number of players and which does not require structured telecommunications links such as dial up telephone links or local area network links.

According to one aspect of the present invention, there is provided a game server for a multi-player game system. The game server comprises:
  a game driver for executing a multi-player game and generating game information for playing the multi-player game by at least one game client through a telecommunication network,
  prioritizing means for prioritizing the game information and responsively queuing the game information for transmission to the at least one game client,
  aperture control means for optimizing the game information for transmission to the at least one game client, and
  communications means for transmitting the game information through the telecommunication network to the at least one game client and for receiving processed user input through the telecommunication network from the at least one game client and transmitting the processed user input to the game driver.

According to another aspect of the present invention there is provided method of operating a multi-player game system having a game server communicating with a plurality of game clients connected through a telecommunications network. The method comprises the steps of, for each game client:
  prioritizing game information generated by a game driver executing a multi-player game,
  queuing the game information in order of priority for transmission to the game client,
  optimizing transmission of the game information to the game client,
  transmitting the game information through the telecommunication network to the game client,
  receiving processed user input through the telecommunication network from the game client and transmitting the processed user input to the game driver, and
  repeating the steps for playing the multi-player game.

According to another aspect of the invention, there is provided an article of manufacture comprising:
  a computer usable medium having computer readable program code means embodied therein for implementing a multi-player game playable by at least one game client connected through a telecommunications network. The computer readable program code means in the article of manufacture comprises:
  computer readable program code means for causing the computer to prioritize game information generated by a game driver executing a multi-player game,
  computer readable program code means for causing the computer to queue the game information in an order of priority for transmission to the at least one game client,
  computer readable program code means for causing the computer to optimize transmission of the game information to the at least game client,
  computer readable program code means for causing the computer to transmit the game information through the telecommunication network to the at least one game client,
  computer readable program code means for causing the computer to receive processed user input through the telecommunication network from the game client and to transmit the processed user input to the game driver.

BRIEF DESCRIPTION OF THE DRAWINGS

Preferred embodiments of the present invention will now be described, by way of example only, with reference to the attached figures, wherein.

DETAILED DESCRIPTION OF THE INVENTION

Figure 1:
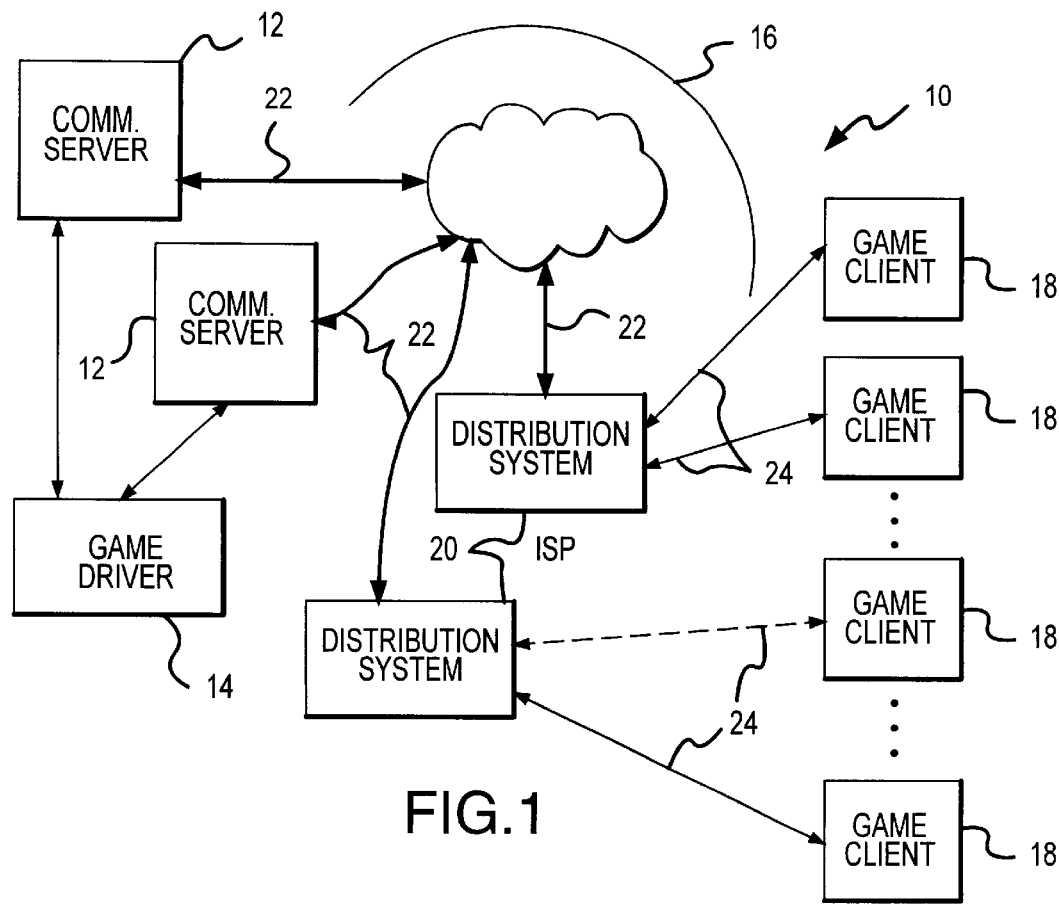
FIG. 1 shows a schematic representation of an Internet-based embodiment of the present invention.

A multi-player game system in accordance with the present invention is indicated generally at 10 in FIG. 1. Game system 10 includes a game driver 14 connected to one or more communications servers 12. Communications server 12 is connected to a telecommunication network 16 which is in turn connected to a plurality of game clients 18 via a distribution system 20.

In the embodiment shown in FIG. 1, it is contemplated that telecommunication network 16 will be a data packet type network, such as an IP based network. Thus, network 16 will generally comprise a variety of relatively high bandwidth point to point telecommunications links 22, the actual number of identity of the links 22 being subject to change, on a packet to packet basis, depending upon packet routing. The dynamic arrangement of these telecommunications links 22 is indicated in FIG. 1 by the cloud-shaped block.

While it is contemplated that, in particular, game system 10 can advantageously employ the Internet as telecommunication network 16, it will be apparent to those of skill in the art that the present invention is not limited to such use. Accordingly, other suitable telecommunication networks, including networks which are not packet-based, and will occur to those of skill in the art, can be employed with the present invention as desired.

Distribution system 20 connects game clients 18 to telecommunication network 16 via telecommunications links 24. In the case wherein telecommunication network 16 is the Internet, it is contemplated that distribution system 20 will be an Internet Service Provider (ISP) or the like and telecommunications links 24 will be dial up telephone links, preferably with data communication rates of at least 9600 baud and higher, with higher rates being preferred. It is also apparent to those skilled in the art that distribution system 20 is not limited to a single ISP; multiple ISP's can connect other game clients 18 via separate telecommunications links 24.

As will be apparent to those of skill in the art, any other data transmission technique, such as CATV networks, ISDN or distributed fiber optic networks can be used for telecommunications link 24. In any case, it will be understood by those of skill in the art that telecommunications links 24 will be connected to game clients 18 by a suitable data interface for transmitting and receiving data.

Each game client 18 can be any computer platform suitable for executing a game and maintaining a telecommunication link and such platforms include IBM PC compatible computer systems, Apple Macintosh computer systems, games computer systems such as a SEGA Saturn games computer, game consoles or set top consoles.

Figure 2:
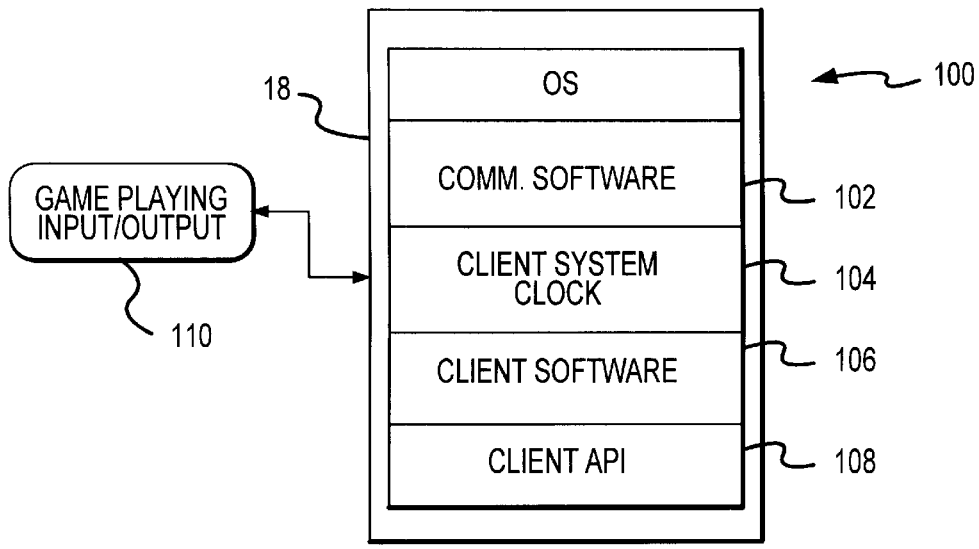
FIG. 2 shows a block diagram of a game client for the embodiment of FIG. 1.

As shown in FIG. 2, each game client 18 can comprise an operating system 100, a communications software 102, an optional client system clock 104 or other means of system synchronization, game client software 106 and a game client API 108 providing a defined interface between communications software 102 and game client software 106. In addition, game client 18 includes game playing input and output devices 110 to interact with the game player.

Operating system 100 can be any suitable operating system which provides at least a set of basic input and output functions for the hardware platform. If an IBM PC compatible system is selected, operating system 100 can be a GUI-based operating system such as Windows 95 or OS/2 Warp, or an older operating system such as MS-DOS. If an Apple Macintosh is selected, operating system 100 can be Apple's System 7, etc. If a games computer system is selected, such as a SEGA Saturn, Nintendo Ultra or the like, operating system 100 may be rudimentary and/or specifically written to provide necessary system level functions for use as a component of the software of game client 18.

Communications software 102 cooperates with operating system 100 and the communications hardware, such as a modem, LAN or WAN, of game client 18 to establish, maintain and utilize telecommunication link 24 to distribution system 20. Communications software 102 operates to receive information from communications server 12, via telecommunication network 16 and telecommunications link 24 and to forward this received information to client software 106 via client API 108. Communications software 102 also operates to receive information from client software 106, via client API 108, and to transmit this processed data to communications server 12 via telecommunications link 24 and network 16. As will be apparent to those of skill in the art, the transmission of data to game client 18 need not occur at the same rate as data is transmitted from game client 18.

In any event, communications software 102 performs all of the functions necessary to effect the receipt and transmission of data between communications server 12 and game client 18, including performing the necessary steps to construct suitable packets for transmission and/or decode received packets for use by client software 106, including establishing transmission and receipt buffers or analogous means to buffer information, performing error correction on received packets, providing acknowledgement of packets received and/or re-sending packets, re-ordering packets, etc. A variety of known methods for implementing communications software 102 will be apparent to those of skill in the art and thus will not be further discussed herein.

Client software 106 is executed by game client 18 to, at a minimum, receive input and provide the output necessary for a computer-hosted game to be played at game client 18. Depending upon the hardware capabilities of game client 18, client software 106 can produce a variety of suitable outputs with game playing input and outputs 110 including graphics, text, sounds, etc. Similarly, client software 106 can accept a variety of game player inputs via game playing inputs and outputs 110 including keyboard, joystick, games controller, mouse input, etc.

Client software 106 performs a significant amount of processing of user input received from the game player via game playing input and output 110 and appropriate updating of output. In this manner, raw or processed user input is transmitted back to the game driver 14, limiting the amount of data to be transmitted.

For example, in a flight simulator air combat-type game, client software 106, executing on an IBM PC compatible computer system, can process input received from the game player and produce appropriately updated graphics, status changes, sounds, etc. Specifically, client software 106 will process a user input representing an attitude change for the simulated aircraft through a mathematical model of the flight characteristics of the aircraft to determine the changes to the aircraft's resulting flight condition. The graphics displayed to the game player by game playing input/output 110 is then updated to reflect the appropriate changes to the aircraft's cockpit instruments and the view through the canopy. Further, game client software 106 can determine whether another player's shots have hit, and if so, determine whether the player can continue play. Accordingly, client software 106 preferably performs a significant portion of the processing required to implement a computer hosted game.

It is contemplated that client software 106 will be written or modified specifically for each game intended to be played with system 10 and to provide multi-player compatibilities through network 16 via client API 108. Further, while in some cases client software 106 may be stored in a non-volatile memory in game client 18, it is contemplated that in many circumstances client software 106 will be transmitted to game client 18, as needed, via network 16.

Figure 3:
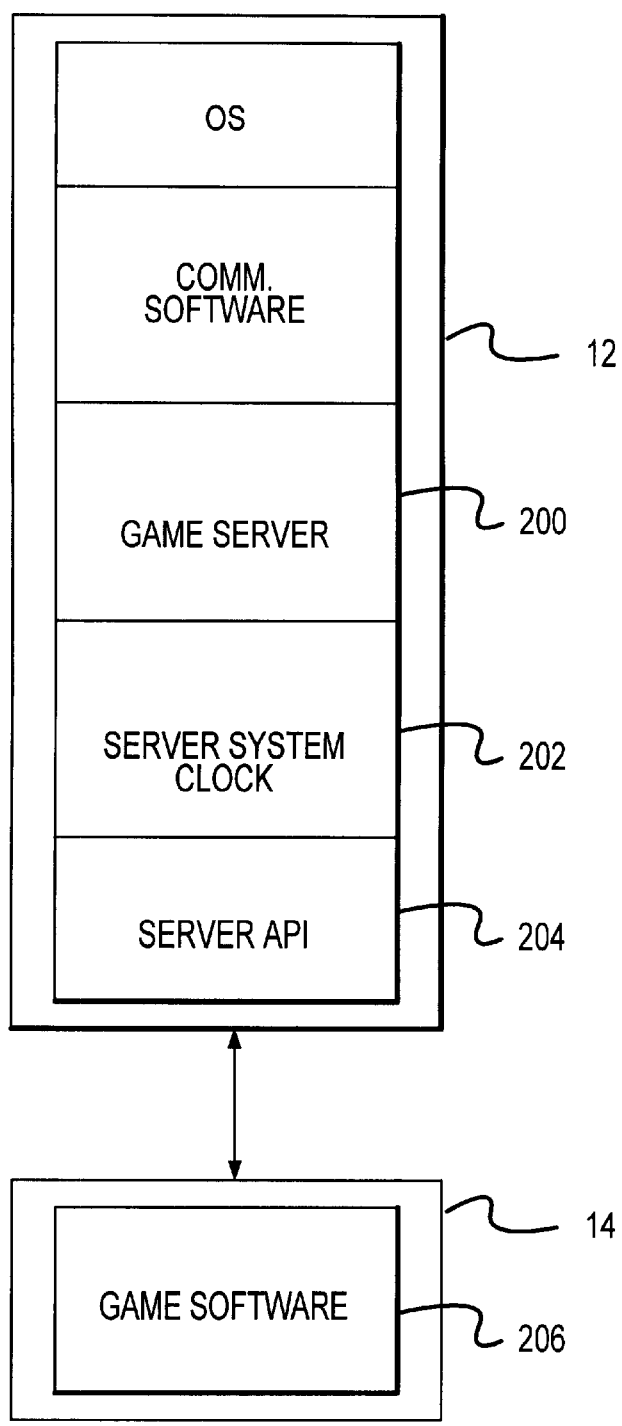
FIG. 3 shows a block diagram of a server and game driver for the embodiment of FIG. 1.

As shown in FIG. 3, communications server 12 may include one or more game servers 200, a server system clock 202, and a server API 204 through which game server 200 communicates with game driver 14.

Game driver 14 includes game software 206 providing the co-ordination and arbitration of events resulting from the play of the game players in a particular multi-player game. Game driver 14 may receive information from game clients 18 to which it is connected via communications server 12. The information is processed by game software 206 to produce an appropriate output which is then transmitted to each affected game client 18. For example, in an interactive air combat type game, game driver 14 may receive information that a player has fired a shot. After processing by game software 206, the output may be that the player has shot down another player at a different game client 18. Game driver 14 may also transmit information of a global nature to each game client 18, such as a transition from day to night occurring in the game.

Game driver 14 may be integrated with communications server 12. However, it is contemplated that game driver 14 be separate software of the multi-player game system 10. An advantage of separating the communications server 12 from the game driver 14 is that a variety of different games can be played by using different game drivers simultaneously with a single communications server 12. Additionally, one or more game drivers 14, responsible for a single game, may communicate with multiple communications servers 12 to communicate with a greater number of game clients 18. However, it is apparent to those skilled in the art that when multiple communications servers 12 are used, the multiple communications servers 12 must be synchronized. Synchronization can be through a network time protocol, or independent means associated with the system.

Game information, in the form of information packets, is forwarded from game driver 14 through server API 204 to game server 200, for transmission to game clients 189. Associated with each information packet is a component referred to by the present inventors as a Relevancy Vector (RV). The RV is a logical construct which provides an indication of the importance of the information in the information packet relative to other packets intended for the same game client 18. In the preferred embodiment, RV's are multidimensional arrays of values that can be examined by game server 200 to evaluate packets against each other to prioritize the packets for transmission. The information packets with the highest RV values are inserted into a queue for transmission to each game client 18 in decreasing order. When information packets are received by the game server 200 which have the same level of importance, the RV is then processed by the game software 206 to arbitrate which is to be transmitted first. The creator of the game software 206 must consider the relative importance of information when creating the game software to provide appropriate rules for arbitrating relative importance of information.

For example, in an air combat simulator game, game driver 204 is continually transmitting some information to each game client 18. This information can be: Location(x, y, z); Heading(s, y, z); Global_Status(Hit, Crashed, Exploding); Local_Status(Firing, Weapons, Burning, Control_Surface_Movement); etc. An RV for this information packet will include information for each piece of data which is appropriate to characterize it's relevance. The actual values in the RV array can be booleans, numerical values, flags or mixture of these types, as may be appropriate for the type of information they are associated with. When information packets have the same integer for the first value, i.e. the same level of importance, the rest of the RV is then processed by the game software 206 to arbitrate which information packet is to be transmitted first.

For example, the RV can contain the following information:

Location: How far away is the sending aircraft from the receiving aircraft? Is the sending aircraft in the field of view of the receiving pilot?

Heading: Is the sending aircraft heading towards or away from the receiving aircraft? If towards, how quickly are they closing?

Global Status: If any defined event is occurring, is it important?; and

Local_Status: How important is an event to a particular client? This could, for example, depend upon physical distance for visual effects or the age of the information.

One of the contemplated advantages of the present invention is that telecommunications network 16 can be the Internet or other network. However, such networks have problems in that the bandwidth available for transmission of a packet from communications server 12 to a game client 18 can change from packet to packet and certainly each time a new telecommunications link 24 is established. Further, depending upon the type of packet protocol employed, it is not always possible to certify delivery of a packet and/or the delivery order of a series of packets. For example, the packet protocol employed on the Internet is presently IP which provides for TCP packets and UDP packets. The delivery and delivery order are guaranteed for a TCP packet. In contrast, delivery and/or delivery order of UDP packets is not guaranteed.

While it is desirable to always employ TCP packets or the like, these typically result in a reduced overall useful throughput in telecommunication network 16 due to the protocol overhead and the bandwidth used to transmit the acknowledgement packets which are sent by the destination to confirm receipt of the packet. Therefore, in the embodiment of the present invention shown in FIG. 1, UDP packets are employed to maximize the useful throughput of telecommunication network 16. Accordingly, client software 106 and game software 206 are constructed with the assumption that telecommunication network 16 is "lossy", i.e. —some packets may not arrive at their intended destination, as is described below in more detail.

Figure 4:
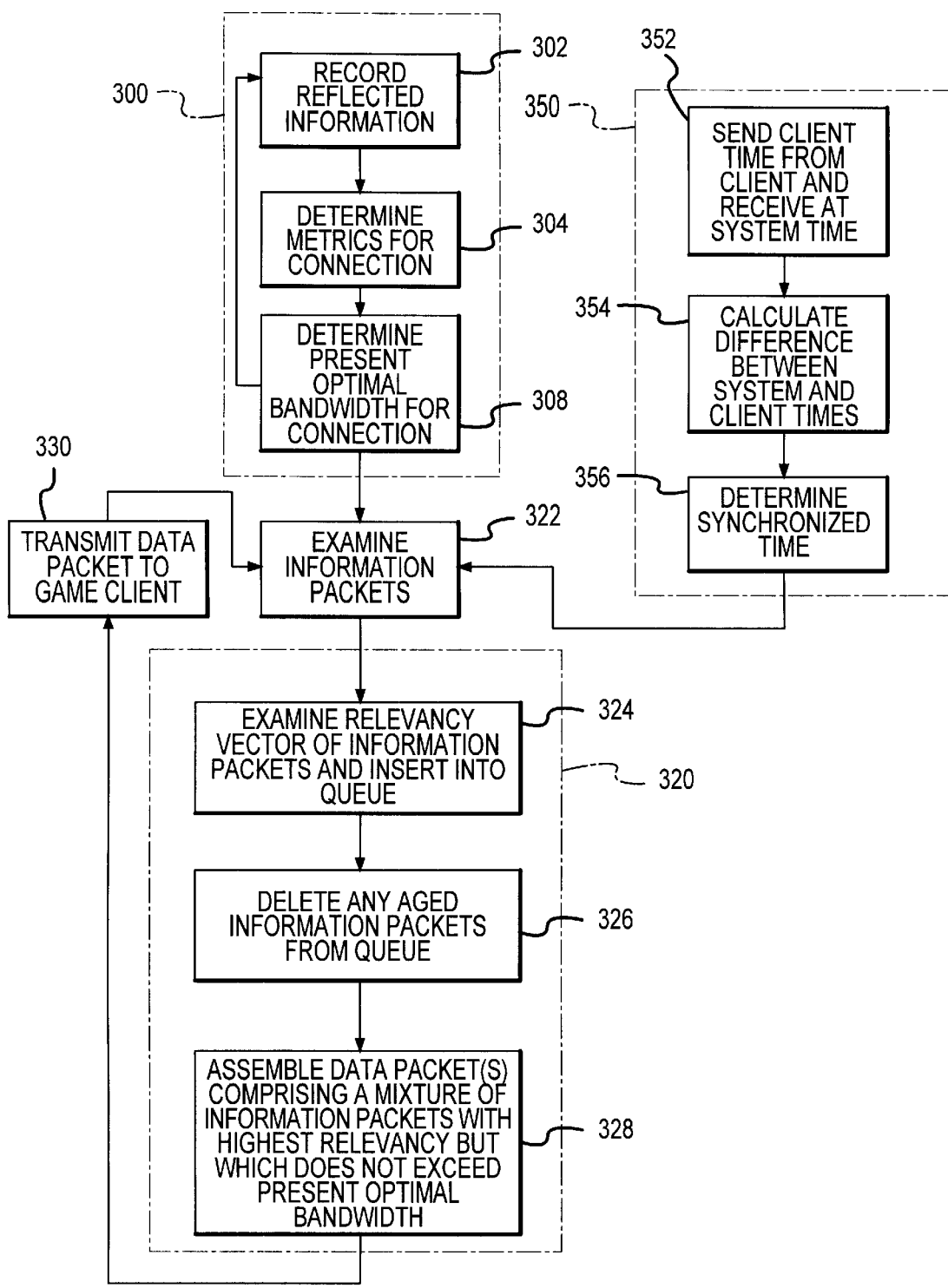
FIG. 4 shows a block diagram of performance monitoring, aperture control and synchronization functions of the game server shown in FIG. 3.

To achieve satisfactory performance regardless of the lossy nature of the transmission network, game server 200 performs a performance monitoring function 300 and a bandwidth aperture function 320, each of which is discussed below with reference to FIG. 4.

In the performance monitoring function 300, the game server 200 attempts to monitor the available bandwidth of the connection between game server 200 and each respective game client 18. Specifically, at step 302, game server 200 'floods' a connection to a respective game client by transmitting packets at an initial bandwidth predetermined by the capabilities of the transmission network, and varying the transmission speed up or down depending on the capabilities of the connection to a specific game client 18. In a manner somewhat similar to the PING utility of the IP protocol, information relating to the transmission time of these packets is reflected back to game server 200 and recorded. Alternatively, information relating to the transmission time of packets can be assessed on an ongoing basis without flooding the connection.

The information reflected back to performance monitoring function 300 at server 200 includes the total round trip transmission time. However unlike the PING utility, the packets are of a variety of sizes, rather than a fixed size, to more closely replicate the real world transmission of game data packets which are of variable length. The performance monitoring function 300 increase or decreases the transmission rate and records the transmission time for each packet sent back to game server 200.

From the data produced in the above-described latency test, at step 304 the performance monitoring feature develops a set of metrics for each connection, including the bandwidth available and, more importantly, how the latency in the connection varies with bandwidth utilization ad packet size. These metrics are used in conjunction with the aperture control function 320. The communications bandwidth is maximized to an optimal bandwidth until the predetermined maximum latency is exceeded.

In general, the optimal bandwidth is determined by determining a maximum bandwidth at the predetermined maximum latency. If the maximum bandwidth is greater than the initial bandwidth, the initial bandwidth is increased to the maximum bandwidth. If the maximum bandwidth is less than the initial bandwidth, the initial bandwidth is incrementally reduced to the maximum bandwidth. The process is continuously repeated varying the optimal bandwidth. If the maximum bandwidth is outside predetermined limits at any time, the connection is terminated.

The predetermined maximum latency is set by the author of the game. Certain games can withstand greater latency than others. For instance, chess can have an extended latency whereas air combat games must have a very short latency.

It will be understood by those of skill in the art that performance monitoring function 300 will be performed each time a connection is established to a game client 18 and is assessed on an ongoing basis. Game server 200 continuously monitors each transmission of each information packet and will determine whether the latency is increasing or decreasing. In response, the bandwidth is varied so that the predetermined maximum latency is not exceeded.

As will be apparent to those of skill in the art, transmission latency is an important consideration in implementing a multi-player computer hosted game and, specifically, interactions between players which are subject to large latencies are often unacceptable. For example, an unacceptable latency can result in one player in an air combat simulator shooting at another player who avoids the shot because he has moved to another location before the data representing the shot arrives at his game client 18 from game server 200. Accordingly, the present inventors have determined that game server 200 must give consideration to the metrics for both the available bandwidth and the latency characteristics for each connection and these metrics are used to derive a present optimal bandwidth for the connection at step 306. As used herein, the term present optimal bandwidth refers to the bandwidth at which the best transmission bandwidth is obtained for a preselected maximum latency.

As will be apparent to those of skill in the art, each of the game clients 18 may experience a different latency with the consequence that different game clients 18 will transmit and receive information at different rates. This is further complicated by the fact that the latency for each game client changes every time a new Internet connection is made. Moreover, each of the client system clocks 104 and game system clock 202 may be set to different times. Therefore, further associated with each information packet is a time stamp.

Communications server 12 time stamps the information packet when it is inserted in the queue and sets an age limit on each information packet. In order that the time stamp associated with each information packet is consistent for each game client 18, the time stamp attached to each information packet is synchronized with the game client's client system clock 104 by synchronization function 350. Each time game client 18 makes a new connection, a client time signal according to the client system clock 104 is sent to the game driver 14 where the signal is received at a certain system time as indicated by the game system clock 202 at step 352. Game driver 14 calculates the difference between the system time and client time at step 354.

When an information packet is being assembled for a specific game client 18, the difference calculated at step 354 is subtracted from the system time to arrive at the synchronized time stamp in step 356.

As mentioned above, game server 200 implements an aperture control function 320. Aperture control function 320 is used to proactively restrict and optimize the bandwidth of the data leaving communications server 200 to the present optimal bandwidth for the connection. Specifically, at step 322, game server 200 examines each information packet received from game driver 14 to determine its bandwidth requirements.

At step 324, game driver 14 examines the RV associated with each information packet and determines the relevance of each information packet relative to those others intended for the same game client 18. The information packets with the highest relevancy are inserted into a queue in decreasing order.

At step 326, if the time the information packet sits in the queue exceeds its age limit, then the information packet is discarded or deleted. Otherwise, the information packets remain in the queue and could be assembled into larger data packet(s) which will not exceed the present optimal bandwidth at step 328. Game server 200 assembles the information packets into one or more data packets and transmits the data packets to game client 18 at step 330.

In the example EV given above, if an information packet relates to an aircraft which is firing its weapons, but which is out of range of the aircraft flown by the player at a game client 18, then aperture control function 320 will queue this information packet if the present optimal bandwidth to game client 18 would be exceeded. If the aircraft is flying and there are several other aircraft flying, some nearer than others, then the information packets relating to the nearest aircraft are transmitted first and more frequently to the game client 18.

The above-described embodiments of the invention are intended to be examples of the present invention and alterations and modifications may be effected thereto, by those of skill in the art, without departing from the scope of the invention.

We claim:

1. A system, comprising:

a driver for generating application information for using an application by a computer platform through a telecommunication network, prioritizing means for prioritizing said application information based on a relevancy vector comprising an attribute of said application information that can be examined to determine relative importance of said application information, and communications means for transmitting said application information through said telecommunication network to said computer platform.

2. A system as claimed in claim 1 further including an aperture control means for optimizing said application information for transmission to said computer platform that comprises monitoring means for determining an optimal bandwidth of a connection through said telecommunications network to said computer platform; and limit means for limiting a bandwidth for transmission of said application information to said optimal bandwidth.

3. A system as claimed in claim 2 wherein said monitoring means comprises means for flooding said connection with information to determine a latency characteristic of said connection;

means for developing a set of metrics for said connection responsive to said latency characteristic; and means for assessing said set of metrics and responsively determining said optimal bandwidth.

4. A system as claimed in claim 1 wherein said application information is generated in information packets, and said prioritizing means assesses each information packet, produces an array of values indicative of a relevance relative to other information packets for said computer platform and assesses the array for queuing each information packet in order of highest relevance first.

5. A system as claimed in claim 4 further comprising means for receiving a time signal from said computer platform when said computer platform connects with said system through said network and determining a difference between a system time and time of said computer platform, and synchronization means for applying said difference to each information packet.

6. A system as claimed in claim 5 wherein said prioritizing mean has means for setting an age limit for each information packet to remain in a queue, and means for discarding each information packet from the queue if said age limit is exceeded.

7. A system as claimed in claim 1 wherein said system has a plurality of drivers.

8. A system as claimed in claim 2 wherein said driver generates application information for said application by at least two of said computer platforms through a telecommunication network, and said prioritizing means prioritizes said application information and responsively queues said application information for each of said at least two computer platforms, and said aperture control means optimizes said application information for transmission for each of said at least two computer platforms.

9. A method of operating a multilateral interactive application system having a first computer device communicating with a plurality of clients in communication with a second computer device connected through a telecommunications network comprising:

with said first computer device, prioritizing portions of application information generated by an application driver linked to said first computer device and executing a multilateral interactive application, wherein said portions of said application information are prioritized based on a relevancy vector which provides an indication of the importance of said portions of said application information with respect at least one of said clients;

queuing said application information in order of priority for transmission to said second computer device;

transmitting from said first computer device said game information through said telecommunications network to said second computer device and at least one of said clients; and repeating the steps for using said multilateral interactive application.

10. A method as claimed in claim 9, further comprising optimizing transmission of said application information to said second computer device, wherein said optimizing comprises:

determining an optimal bandwidth of a connection through said telecommunications network to said second computer device; and limiting a bandwidth for transmission of said application information to said optimal bandwidth.

11. A method as claimed in claim 10 wherein said step of determining an optimal bandwidth comprises the steps of:

flooding said connection with information at an initial bandwidth to determine a latency characteristic of said connection;

developing a set of metrics for said connection responsive to said latency characteristic; and assessing said set of metrics and responsively determining a maximum bandwidth at a preselected maximum latency, and if the initial bandwidth is less than the maximum bandwidth, increasing the initial bandwidth to said maximum bandwidth, and if said initial bandwidth is greater than said maximum bandwidth incrementally reducing the initial bandwidth to said maximum bandwidth and if the maximum bandwidth is outside predetermined limits, terminating the connection.

12. A method as claimed in claim 10, wherein said determining an optimal bandwidth is repeated each time another said second computer device is connected to the first computer device through the telecommunications network.

13. A method as claimed in claim 9, wherein said application information is generated in information packets, and said prioritizing comprises assessing each of said information packets for its relevance relative to other information packets for said at least one of said clients, and queuing each information packet in order of highest relevance first.

14. A method as claimed in claim 13 wherein said method further includes:

receiving a time signal from the second computer device when said at least one of said clients connects with said first computer device through said network;

determining a difference between a first computer device time and time of said application driver, and applying said difference to each of said information packets.

15. A method as claimed in claim 14 wherein said step of claim 14 is conducted on an ongoing basis.

16. A method as claimed in claim 14 wherein said prioritizing includes setting an age limit for each of said information packets to remain in said queue, and discarding each of said information packets from the queue if said age limit is exceeded.

17. An article of manufacture comprising:

a computer usable medium having computer readable program code means embodied therein for implementing a multilateral interactive application useable by at lest one client connected through a telecommunications network via a first server, the computer readable program code means in said article of manufacture comprising:

computer readable program code means for causing a second server linked to said first server via said telecommunications network to prioritize application information generated by an application driver executing said multilateral interactive application;

computer readable program code means for causing said second server to queue said application information in an order of priority for transmission to the at least one client;

computer readable program code means for causing said second server to optimize transmission of said application information to the at least client;

computer readable program code means for causing said second server to transmit said game information through said telecommunication network to the at least one client; and computer readable program code means for causing said second server to receive processed user input through said telecommunication network from the client and to transmit said processed user input to said application driver;

wherein said computer readable program code means for said second server to prioritize application information generated by an application driver executing a multilateral application includes computer readable program code means for assessing information packets of said application information for producing an array of values indicative of a relevance relative to other information packets for said client and for assessing the array for queuing each information packet in order of highest relevance first.

18. The article of manufacture as claimed in claim 17 wherein said computer readable program code means to optimize transmission of said application information to the at least one client, includes computer readable, code means for flooding said connection with information to determine a latency of said connection;

computer readable code means for developing a set of metrics for said connection responsive to said latency; and computer readable code means for assessing said set of metrics, and responsively determining a maximum bandwidth at a preselected maximum latency, and for increasing an initial bandwidth to said maximum bandwidth if the initial bandwidth is less than the maximum bandwidth, and incrementally reducing the initial bandwidth to said maximum bandwidth if said initial bandwidth is greater than said maximum bandwidth and terminating the connection if the maximum bandwidth is outside predetermined limits.

19. The article of manufacture as claimed in claim 18 wherein said computer readable program code means for optimizing transmission of said application information to the at least one client, further includes computer readable code means for receiving a time signal from the client;

computer readable code means for determining a difference between a second server time and time of said client, and computer readable code means for applying said difference to each information packet.

20. The article of manufacture as claimed in claim 19 wherein said computer readable program code means for optimizing transmission of said application information to the at least one client, further includes computer readable code means for causing the said computer readable program code mean for optimizing transmission of said application information to the at least one client to optimize on an ongoing basis.

21. The article of manufacture as claimed in claim 18 wherein said computer readable program code means for causing the computer to prioritize application information generated by an application driver executing a said multilateral interactive application further comprises:

computer readable code means for setting an age limit for each information packet to remain in said queue, and computer readable code means for discarding each information packet from the queue if said age limit is exceeded.

22. A method for initiating and scaling massive concurrent data transactions over a communication network, comprising:

receiving application information intended for transmission to a device linked to the communication network, wherein the application information comprises a plurality of information packets each having an indication of importance of the application information in the particular information packet relative to other ones of the information packets;

examining the received application information to determine relevancy of the information packets based on the indication of importance; and transmitting to the device the information packets in the received application information in descending order of the determined relevancy with an information packet having high relevancy being transmitted first.

23. The method of claim 22, further comprising prior to the transmitting determining whether a transmission latency to the device is increasing or decreasing and based on the determining, varying a bandwidth used in the transmitting such that the transmitting bandwidth is less than about a predetermined maximum latency.

* * * * *